(12) United States Patent
Els

(10) Patent No.: US 10,757,075 B2
(45) Date of Patent: *Aug. 25, 2020

(54) DEVICE SPECIFIC WEBSITE FILTERING USING A BIFURCATED DOMAIN NAME SYSTEM

(71) Applicant: Calix, Inc., Petaluma, CA (US)

(72) Inventor: Henning Els, Penngrove, CA (US)

(73) Assignee: Calix, Inc., Petaluma, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 15/488,111

(22) Filed: Apr. 14, 2017

(65) Prior Publication Data

US 2018/0302375 A1    Oct. 18, 2018

(51) Int. Cl.
   *H04L 29/06*   (2006.01)
   *H04L 29/12*   (2006.01)
   *H04L 29/08*   (2006.01)

(52) U.S. Cl.
   CPC ...... *H04L 63/0236* (2013.01); *H04L 61/1511* (2013.01); *H04L 63/0263* (2013.01); *H04L 63/102* (2013.01); *H04L 67/02* (2013.01); *H04L 67/32* (2013.01); *H04L 61/2514* (2013.01); *H04L 61/6022* (2013.01); *H04L 67/10* (2013.01)

(58) Field of Classification Search
   USPC .......... 726/12, 2, 21, 36; 713/150, 163, 181; 380/255, 264, 276
   See application file for complete search history.

(56) References Cited

U.S. PATENT DOCUMENTS

| 9,705,922 B2 | 7/2017 | Foxhoven et al. |
| 10,469,499 B2 | 11/2019 | Els et al. |
| 2004/0003113 A1 | 1/2004 | Keohane et al. |
| (Continued) | | |

FOREIGN PATENT DOCUMENTS

WO    WO-2015121617 A1    8/2015

OTHER PUBLICATIONS

U.S. Appl. No. 15/198,781, filed Jun. 30, 2016, Website Filtering Using Bifurcated Domain Name System.
(Continued)

*Primary Examiner* — Sharif E Ullah
(74) *Attorney, Agent, or Firm* — Schwegman Lundberg & Woessner, P.A.

(57) ABSTRACT

Systems and techniques for location independent website filtering using bifurcated domain name system are described herein. A domain name system (DNS) request may be received. A unique device identifier may be received for the requesting device. The ISP may provide external network services to the services gateway. The DNS service provider may maintain a website filtering policy. The DNS request may be forwarded to the DNS service of the ISP. The DNS service of the ISP may respond with a DNS resolution. An access control request may be forwarded to the DNS service provider external to the ISP. A website filtering policy associated with the device identifier may be used to determine website access. The DNS service provider external to the ISP may respond with a grant/block status. Based on the returned grant/block status, the services gateway may respond to the requesting device with the DNS resolution or access denial.

15 Claims, 7 Drawing Sheets

(56) References Cited

U.S. PATENT DOCUMENTS

| | | | |
|---|---|---|---|
| 2004/0199595 A1* | 10/2004 | Banister | G06Q 10/107 709/207 |
| 2005/0105513 A1* | 5/2005 | Sullivan | H04L 29/12018 370/352 |
| 2008/0201413 A1* | 8/2008 | Sullivan | H04L 29/12066 709/203 |
| 2008/0209057 A1 | 8/2008 | Martini et al. | |
| 2009/0157889 A1 | 6/2009 | Treuhaft | |
| 2012/0023153 A1 | 1/2012 | Karasaridis | |
| 2012/0203904 A1 | 8/2012 | Niemela et al. | |
| 2012/0297478 A1 | 11/2012 | Martin et al. | |
| 2012/0297578 A1 | 11/2012 | Christie et al. | |
| 2013/0225151 A1 | 8/2013 | King et al. | |
| 2014/0379916 A1 | 12/2014 | Chan et al. | |
| 2015/0271031 A1* | 9/2015 | Beevers | G06F 16/29 709/224 |
| 2015/0288721 A1 | 10/2015 | Lemon et al. | |
| 2015/0334116 A1 | 11/2015 | Martini | |
| 2015/0350229 A1* | 12/2015 | Mitchell | G06F 16/955 726/23 |
| 2017/0374088 A1 | 12/2017 | Pappu et al. | |
| 2018/0007054 A1* | 1/2018 | Els | H04L 61/1511 |
| 2019/0014083 A1* | 1/2019 | Xu | H04L 61/3025 |

OTHER PUBLICATIONS

"U.S. Appl. No. 15/198,781, Final Office Action dated Jul. 6, 2018", 15 pgs.

"U.S. Appl. No. 15/198,781, Non Final Office Action dated Mar. 29, 2018", 12 pgs.

"U.S. Appl. No. 15/198,781, Response filed Jun. 12, 2018 to Non Final Office Action dated Mar. 29, 2018", 12 pgs.

"U.S. Appl. No. 15/198,781, Advisory Action dated Sep. 18, 2018", 2 pgs.

"U.S. Appl. No. 15/198,781, Final Office Action dated Feb. 11, 2019", 16 pgs.

"U.S. Appl. No. 15/198,781, Non Final Office Action dated Oct. 31, 2018", 16 pgs.

"U.S. Appl. No. 15/198,781, Response to Non Final Office Action dated Oct. 31, 2018 filed Jan. 21, 2019", 13 pgs.

"U.S. Appl. No. 15/198,781, Notice of Allowance dated Jul. 12, 2019", 9 pgs.

"U.S. Appl. No. 15/198,781, Response filed May 13, 2019 to Final Office Action dated Feb. 11, 2019", 11 pgs.

* cited by examiner

DEVICE SPECIFIC WEBSITE FILTERING USING A BIFURCATED DOMAIN NAME SYSTEM

CROSS-REFERENCE TO RELATED APPLICATIONS

This application is related to U.S. patent application Ser. No. 15/198,781, titled "WEB SITE FILTERING USING BIFURCATED DOMAIN NAME SYSTEM", and filed on Jun. 30, 2016 to Henning Els, the entire content of which being incorporated herein by reference.

TECHNICAL FIELD

The disclosure generally relates to computer networks and, more particularly, to website filtering using domain name system (DNS).

BACKGROUND

A computer network is a collection of interconnected computing devices that may exchange data. Computer devices on the computer network may communicate with each other using a system of addresses such as internet protocol (IP) addresses. Some computer devices on the computer network may host web-based services or resources that are available to users such as, for example, a website. A user may not know the individual IP address of a computing device or collection of computing devices hosting a website. However, the user may know the uniform resource locator (URL) for the resource the user would like to reach. The URL may be a more memorable reference such as, for example www.somewebsite.com. When the user enters the address into a browser of a computing device, the computing device may contact a domain name system (DNS) server to resolve the URL into an IP address hosting the resource. Some websites contain content that may be harmful to a receiving computer device such as, for example, a virus. Some websites may contain content that some users may find objectionable. A person may wish to control the content accessed by another, such as a parent limiting the websites a child may view. A person, such as a parent, can control content access for people and devices within a home, but when a person, such as a child, leaves the home, the content control mechanisms may end.

SUMMARY

In general, this disclosure describes techniques that may allow a services gateway (e.g., a modem, router, other internet service terminal, etc.) to bifurcate (e.g., split) a DNS request into two DNS requests to be forwarded to an ISP DNS server and an external DNS server (e.g., a website filtering DNS server). The services gateway may then receive two responses to the DNS request including an IP address for a hostname included in the DNS request from the ISP DNS server and an indication of whether a client device should be allowed to continue to the hostname from the external DNS server. Bifurcating the DNS request may increase performance by allowing the requests to be processed in parallel and may increase reliability as DNS resolution may not be impacted if the external DNS fails to respond to the request.

There are websites directed to almost every possible subject, including some that people may find objectionable, especially for children. One approach to control access is to filter websites locally, such as at the family computer or at the internet services gateway which serves the home. Unfortunately, for the purposes of filtering content, internet access hot spots have become plentiful, such as at the local coffee shop, which will not have the website filters a user, especially a child user, would have at home.

A similar problem exists when a user visits a friend at a neighbor's home. A user, such as a child, may visit a friend's home and the user may use their personal communication device, such as a smartphone, to access the internet using the internet services provided by the friend's services gateway. However, the friend's home's services gateway may not have the same general content restrictions as the child user's home's services gateway. Using various techniques of this disclosure, the bifurcated DNS request, with one of the DNS servers being a remote website filtering server, attempts to solve this problem. Thus, when a user connects to the internet with their device, whether at home, a coffee shop, or a friend's house, the same website filters may be applied because the content restrictions may be associated with the user's device rather than the gateway device.

In one example, this disclosure is directed to a services gateway for website filtering using bifurcated domain name system (DNS). The services gateway comprises one or more processors and at least one memory including instructions that, when executed by the one or more processors, cause the one or more processors to perform operations to receive a DNS request from a client computing device, the DNS request including a hostname corresponding to a website and a device identifier for the client computing device; forward the DNS request to an internet address for the DNS service of the internet service provider (ISP), the ISP providing external network services to the service gateway; forward the DNS request and the device identifier to an internet address for the DNS filtering service provider external to the ISP, the DNS filtering service provider maintaining one or more website filtering policies; receive a first response to the DNS request from the DNS service of the ISP; receive a second response to the DNS request from the DNS filtering service provider external to the ISP, wherein the second response includes a grant/block status identifier; determine a DNS request response based on the grant/block status identifier, wherein the DNS request response comprises either the first response or a denial message; and transmit the DNS request response to the client computing device, the client computing device connected to an internal network provided by the service gateway.

In another example, this disclosure is directed to at least one machine readable medium including instructions for website filtering using bifurcated domain name system (DNS) that, when executed by a machine, cause the machine to perform operations to receive a DNS request, the DNS request including a hostname corresponding to a website and a device identifier for a requesting client computing device; forward the DNS request to both an internet address for the DNS service of the internet service provider (ISP), the ISP providing external network services to the services gateway; forward the DNS request and the device identifier to an internet address for the DNS filtering service provider external to the ISP, the DNS service provider maintaining one or more website filtering policies; receive a first response to the DNS request from the DNS service of the ISP; receive a second response to the DNS request from the DNS filtering service provider external to the ISP, wherein the second response includes a grant/block status identifier; determine a DNS request response based on the grant/block status identifier, wherein the DNS request response comprises either the first response or a denial message; and transmit the DNS request response to the requesting client computing device, the requesting client computing device connected to an internal network provided by the service gateway.

In another example, this disclosure is directed to a method for website filtering using bifurcated domain name system (DNS). The method comprises receiving, by a services gateway, a DNS request, the DNS request including a hostname corresponding to a website and a device identifier for a requesting client computing device; forwarding the DNS request to an internet address for the DNS service of the internet service provider (ISP), the ISP providing external network services to the services gateway; forwarding the DNS request and the device identifier to an internet address for the DNS service provider external to the ISP, the DNS service provider maintaining one or more website filtering policies; receiving a first response to the DNS request from the DNS service of the ISP; receiving a second response to the DNS request from the DNS filtering service provider external to the ISP, wherein the second response includes a grant/block status identifier; determining a DNS request response based on the grant/block status identifier, wherein the DNS request response comprises either the first response or a denial message; and transmitting, the DNS request response to the requesting client computing device, the requesting client computing device connected to an internal network provided by the service gateway.

In another example, this disclosure is directed to a domain name system (DNS) server for website filtering using bifurcated DNS. The DNS server comprising one or more processors and at least one memory including instructions that, when executed by the one or more processors, cause the one or more processors to perform operations to receive a DNS request for website access permission from a services gateway, wherein the DNS request includes a hostname corresponding to a website and a device identifier from a requesting client computing device; determine, using a website filtering policy associated with the device identifier, a grant/block status identifier for the DNS request; transmit the grant/block status identifier to the service gateway.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
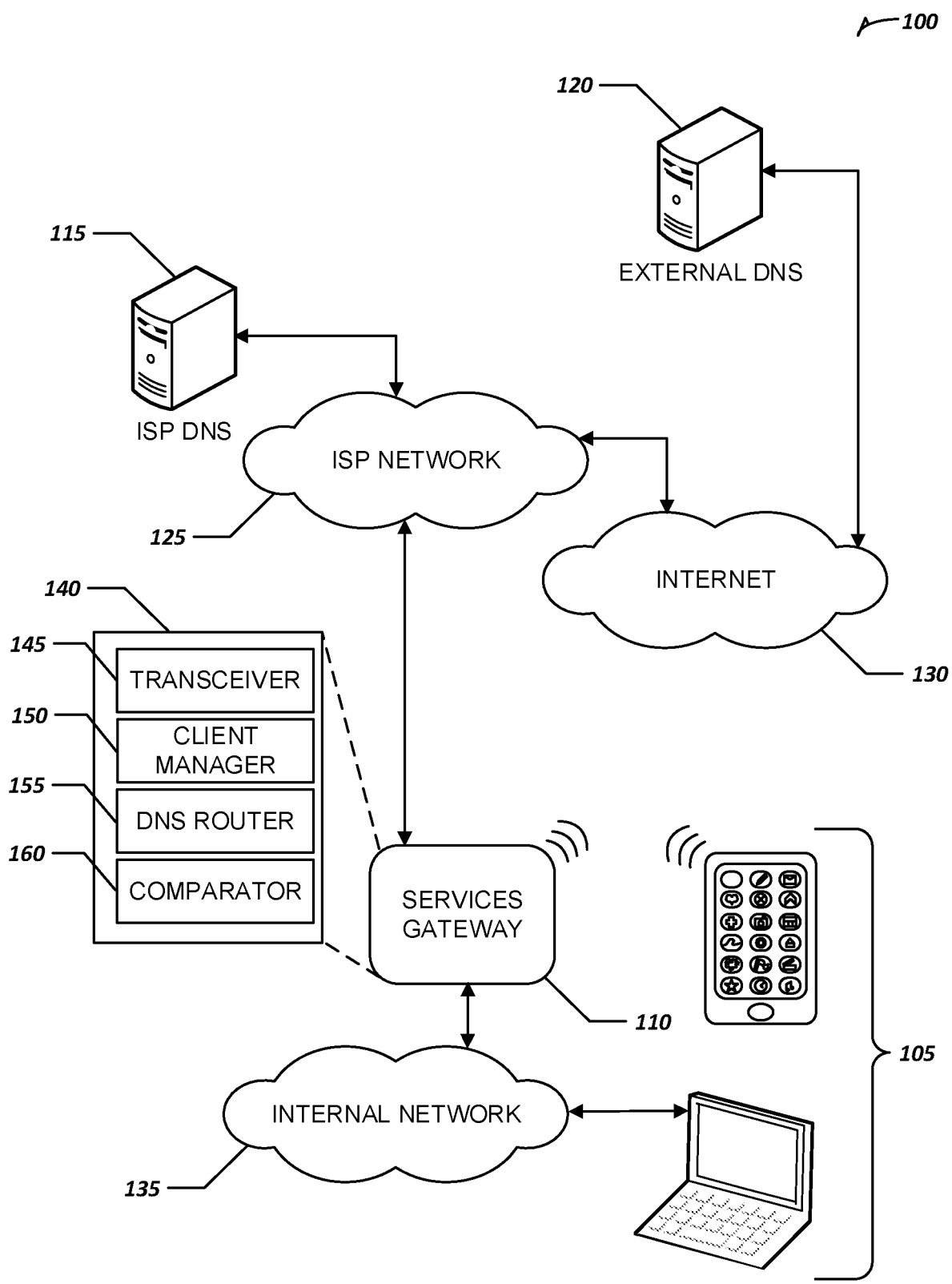
FIG. 1 illustrates an environment including a system for website filtering using bifurcated domain name system, according to various embodiments.

Website filtering may be used for a variety of reasons such as parental control (e.g., to prevent children from viewing objectionable content, etc.) and threat avoidance (e.g., to prevent computer virus infections, email phishing attempts, etc.) Existing techniques may utilize a software client installed on a computing device (e.g., a computer, tablet, phone, etc.) to identify and block websites visited using a web browser. For example, the software client may allow a user to input a list of website uniform resource locators (URL) to which the browser should be prevented from navigating. Some existing techniques may use domain name system (DNS) blocking. However, the existing techniques may rely on reconfiguring the DNS settings on a computing device or a change in the DNS configuration of an internet service provider (ISP).

DNS is a system for resolving a hostname (e.g., such as those included in URLs) into an internet protocol (IP) address (e.g., a network identifier assigned to a computing device that allows communication between the computing device and other computing devices). DNS servers may be authoritative (e.g., hold the master record for an IP address and hostname pair) or recursive (e.g., hold a list of DNS records provided by the authoritative DNS servers). DNS allows users to use memorable hostname URLs such as www.somewebsite.com to access web-based resources rather than having to remember a numerical IP address such as 127.0.0.1 for each website host they would like to visit.

The present subject matter includes systems and techniques for providing website filtering using bifurcated DNS. A services gateway (e.g., a residential services gateway, etc.) providing an internal network to client computing devices and providing external network (e.g., the internet, etc.) access to the client computing devices. The services gateway may receive DNS requests from client computing devices connected to the internal network.

The techniques disclosed may provide an efficient and quickly deployable solution for web filtering by avoiding reconfiguration of the services gateways and ISP DNS servers as well as avoiding the installation of client software on client computing devices. An additional benefit of the disclosed techniques may be that if the external DNS service is unavailable, but the ISP DNS is available, the subscriber may not lose internet connectivity, but only parental control services. A services gateway may bifurcate the request to the two DNS services, thus, if it receives a response from the ISP DNS and not the external DNS, it may simply return the response it received from the ISP DNS. Therefore, the user may be able to communicate with all sites as resolved by the ISP DNS. In existing techniques, the external DNS may sit 'inline', and the ISP DNS may sit upstream from the external DNS. In such a configuration, if the external DNS becomes unavailable, then both the internet and parental control service may be lost.

The techniques disclosed may also reduce latency as the services gateway may bifurcate the DNS request by forwarding it to an ISP DNS server and to an external DNS service providing website filtering. The DNS request may then be processed by the external DNS service and the ISP DNS server in parallel rather than forwarding a filtering request to a website filtering service (e.g., a web-based service maintain a blocking list, etc.) and subsequently to the ISP DNS server.

The services gateway may be a modem, router, or other network device acting as a termination point for a network provided by an ISP such as, for example, a broadband cable network, a fiber optic network, a digital subscriber line (DSL) network, etc. The services gateway may provide an internal network to client computing devices connected to the services gateway. The services gateway may be connected to an ISP network providing access to external resources (e.g., the internet). The services gateway may be configured as a DNS server for an internal client computing device. When an internal client computing device requests an external resource (e.g., a webpage, etc.) the client computing device may send a DNS request to the services gateway requesting that a hostname provided for the resource be resolved to an IP address.

Client computing devices and electronic devices used to connect to the internet have a unique device identifier. In most cases, a client computing device capable of a network connection has a unique media access control (MAC) address. A client computing device may have other unique device identifiers such as a serial number. When a client computing device requests an external resource, the unique device identifier may be included.

The services gateway may be configured with an IP address for one or more ISP DNS servers as well as one or more IP addresses for one or more external DNS servers of an external DNS service provider. The services gateway may forward the request to a DNS server of the ISP and the DNS server of the ISP may return a response including an IP address corresponding to the hostname. The service gateway may forward the DNS request to a DNS server of the external DNS service provider. The services gateway may also forward the device identifier for the requesting client computing device to the DNS server of the external DNS service provider. The DNS server of the external DNS service provider may resolve the hostname to an IP address.

The DNS server of the external DNS service provider may use the device identifier to locate a website filtering policy. A device identifier, corresponding to a client computing device, may be associated with one or more website filtering policies. A device identifier may also be associated with a person or group. The person or group may then be associated with one or more website filtering policies. By way of associating a device with a person or group, the website filtering policies may apply to the device.

The website filtering policy may contain a list of websites that access may not be granted to, or that are blocked or blacklisted. As an example, the website filtering policy may list several websites such as alcohol or tobacco related websites, that a user does not want devices associated with their child to be able to access. The website filtering policy may include a list of websites which are the only websites that may be accessed or whitelisted by the associated device identifier. As an example, the website filtering policy may be associated with a child's device, and thus the policy will only grant access to websites such as websites for children's cartoon characters. The website filtering policy may also have categorized types of websites that may or may not be accessed by the associated device identifier.

The device identifier, person associated with the device, and location of the filtering policy may all be stored in database. The DNS server of the external DNS service provider may compare the hostname to the website filtering policy. The DNS server of the external DNS service provider may then return a response to the services gateway with an indication that the requested resource (e.g., identified by the hostname, IP address, etc.) is granted or blocked for the requesting client computing device.

Having received the response from the DNS server of the ISP and the DNS server of the external DNS service provider, the services gateway may determine a response to transmit to the internal client computing device. For example, if the response received from the DNS server of the external DNS service provider indicated the resource is allowed, the services gateway may transmit the response provided by the DNS server of the ISP including an IP address corresponding to the hostname to the internal client computing device that sent the DNS request to the services gateway. Or, if the response from the DNS server of the external DNS service provider indicated the resource is blocked, the services gateway may discard the response provided by the DNS server of the ISP and may transmit a message to the internal client computing device that sent the DNS request indicating that the resource was blocked. In this manner, bifurcated DNS may intercept the ISP DNS server response preventing harmful or objectionable content from being delivered to the internal client computing device.

The DNS server of the external DNS service provider may use one or more filtering policies to determine whether a resource is allowed or blocked. In some examples, a filtering policy may be provided by a user of the services gateway. For example, the services gateway may present the user with a graphical user interface for entering individual resources to a block or an allowed list. In an example, the user may be able to select categories of blocked or allowed content (e.g., adult websites, gambling websites, child friendly websites, etc.) The selection of websites or content to allow or block creates a filtering policy. The user may then associate the filtering policy with one or more devices using each device's identifier.

The user may also associate the filtering policy with a named person. The user may then associate one or more devices, using each device's identifier, with a named person, thus applying the filtering policy to each of the devices associated with the named person. The services gateway may then transmit the filtering policy to the external DNS service provider. If multiple external DNS servers are employed, then the external DNS service provider may transmit the new or updated filtering policy to all the external DNS servers.

In some examples, several users may use a variety of computing devices connected to the internal network provided by the services gateway. Individual filtering policies may be generated for each computing device based on an identifier for each computing device (e.g., MAC address, etc. assigned to each computing device) connected to the internal network provided by the services gateway.

In an example, the identifier of an internal computing device may be sent to the DNS server of the external DNS service provider along with the forwarded DNS request. The DNS server of the external DNS service provider may then use the identifier to select a filtering policy. For example, a user called 'John Smith' may have a policy set to 'No parental controls'. Another user called 'Michael Smith', a child of 10 years old, may have a policy set to certain time windows. Each user may be associated with 0 or more devices. For example, John Smith may have devices with MAC of 00:00:00:00:01 and 00:00:00:00:02 (e.g., device identifier). When a request is received by the external DNS service, it may extract the device identifier (e.g., MAC address, etc.) from the request, then may look up the user it belongs to, and may then look up the policy associated with the user. At this point, it may select an appropriate policy to apply to the request.

The external DNS server may serve a large population and the database may use unique identifiers to identify a person in the database to avoid conflicts when multiple people have the same name.

In some examples, the external DNS service provider may maintain a filter list including hosts of known harmful sites. For example, the filter list of known harmful sites may include sites identified to contain computer viruses, host phishing websites, etc. The filter list of known harmful sites may be referenced in addition to a specific filtering policy for each internal client computing device or may be added to each specific filtering policy.

The services gateway may also be configured with a timer to prevent a delay or failed response from the external DNS server from impeding the transmission of a response from the DNS server of the ISP to the client device. In an example, if the external DNS server were to go offline, the services gateway would not receive the required response indicating if a website should be allowed or blocked. The services gateway may have a timer for waiting on a response from the external DNS server. Should the services gateway not receive the response from the external DNS server within the allotted time of the timer, then alternative actions may be taken by the services gateway.

In one example, the services gateway may transmit the DNS request response from the DNS server of the ISP to the client device. In another example, the services gateway may attempt a DNS and allowance request to a different external DNS server. In another example, the services gateway may have website filtering policies stored locally. The services gateway may determine if the device identifier of the requesting client device corresponds to any of the stored filtering policies. If a corresponding filtering policy is located in the memory of the services gateway, the services gateway may then determine if the requested hostname should be blocked or allowed.

A services gateway may also be configured to receive website filtering policies from an external DNS server. A services gateway may make a request for one or more of the filtering policies associated with a device or person. As an example scenario, a user may wish to update the filtering policy for a device, and thus requests viewing the current state of the filtering policy. In another example scenario, a services gateway may determine that a device frequently makes DNS requests through that services gateway. Thus, the services gateway requests the filtering policy associated with the device to be stored locally at the services gateway should the external DNS server ever be offline.

Various techniques of this disclosure may solve the problem of having to reconfigure the DNS addresses of client computing devices and the ISP DNS servers by bifurcating the request into two requests, one to the ISP for resolving the hostname to an IP address and a second to an external DNS service provider for determining whether a resource should be blocked or allowed. The present subject matter may result in faster content filtering as hostname resolution operations and filtering operations may be performed in parallel. The filtering policies may also not be local to one external DNS server. As an example, the policies may be forwarded on to other external DNS servers. As another example, the database and policies may be at a centralized location, which is in communication with the external DNS servers. With multiple external DNS servers having access to a filtering policy for a particular device, it is possible for the device to travel anywhere within a city, state, or country and still have the filtering policy applied when the device makes DNS requests outside the device's home area.

FIG. 1 illustrates an environment 100 including a system 140 for website filtering using a bifurcated domain name system, according to various embodiments. The environment 100 may include one or more client devices 105 communicatively coupled to a services gateway 110 through an internal network (e.g., internal network 135, wireless network, etc.). The services gateway 110 may be communicatively coupled to an internet service provider (ISP) domain name system (DNS) server 115 using an ISP network 125 and to a DNS server of an external DNS service provider 120 using an external network (e.g., the internet 130, etc.).

A user of a client computing device 105 (also referred to in this disclosure as a "client device 105" or a "computing device 105") may request an internet resource (e.g., a webpage, etc.) hosted on an external host (e.g., a server, a collection of servers, etc. providing the resource). For example, the user may open a web browser, enter a uniform resource locator (URL) www.somewebsite.com, and click on a button to request a webpage associated with www-.somewebsite.com. The host of the resource may be found by resolving a hostname included in the URL to an internet protocol (IP) address (e.g., somewebsite.com may be resolved to 127.0.0.1, etc.).

The client computing device may be configured with one or more addresses of DNS servers to which a DNS request may be sent to resolve the hostname to an IP address. The client computing device may be configured with the internet protocol (IP) address of the services gateway 110, which may act as a DNS server. In some examples, the client computing device may be configured to automatically (e.g., without user interaction, etc.) obtain network configuration information from the services gateway 110 (e.g., using dynamic host configuration protocol (DHCP)). The client computing device may be assigned an IP address and may be configured with the IP address of the services gateway 110 acting as a DNS server.

The ISP network 125 may be a network provided by the ISP including a collection of servers providing network services to subscribed devices such as the services gateway 110. The ISP network may include the ISP DNS server 115. The ISP DNS server may provide hostname resolution services for the services gateway 110. For example, the ISP DNS server 115 may resolve hostname www.somewebsite-.com to IP address 127.0.0.1. The ISP network 125 may be considered an external network to the one or more client computing devices 105.

The ISP network 125 may be communicatively coupled (e.g., using a router, etc.) to the internet 130. The internet 130 may be considered external to the ISP network 125 and may include a collection of internet based resources such as the external DNS server 120. The external DNS server 120 may be maintained by an external DNS service provider and may evaluate DNS requests against one or more filtering policies to determine if a host provided in the DNS request should be allowed or blocked. For example, the external DNS server 120 may determine that the DNS request for hostname somewebsite.com should be blocked based on an evaluation of a filtering policy associated with the requesting client computing device. The filtering policy may include websites containing malicious content (e.g., computer viruses, phishing webpages, etc.). The external DNS service is described in additional detail in FIG. 2.

The services gateway 110 may include a system 140 for providing website filtering using bifurcated DNS. The system 140 may include a transceiver 145, a client manager 150, a DNS router 155, and a comparator 160. The system 140 may manage filtering lists and DNS requests for the one or more client computing devices 105.

The transceiver 145 may receive and process incoming and outgoing data. The transceiver 145 may receive a DNS request from a client computing device 105, for example. The DNS request may include a hostname corresponding to a website. The DNS request may be received from a computing device connected (e.g., a computing device 105) to an internal network (e.g., internal network 135, wireless network, etc.) provided by the services gateway 110. For example, the transceiver may receive the DNS request associated with the request for the resource www.somewebsite.com.

Each client device of the one or more client devices 105 may be assigned an internal IP address. The internal IP addresses may not be accessible by external entities (e.g., computers outside the internal network, etc.). The client manager 150 may maintain a record of client computing devices connected to the internal network provided by the services gateway 110. When a DNS request is received from a client device 105, the services gateway 110 may translate the internal IP address of a client computing device to an external IP address assigned to the services gateway 110 by an ISP (e.g., using network address translation (NAT), etc.). For example, the services gateway 110 may forward the DNS request associated with the request for www.somewebsite.com to the ISP DNS server 115 and the external DNS server 120 by adding a device identifier, e.g., MAC address or some other unique identifier, of the client device 105 in the DNS request and retaining the external IP address of the services gateway 110.

The client manager 150 may record requests made by each client device so that responses to the forwarded DNS request may be sent back to the correct client computing device. The external IP address may be maintained because it may be used as the destination IP address of the response and the external DNS server may use this information to determine from which network subscriber (e.g., residence, business, etc.) the DNS request came from. Once the external DNS server receives the device identifier with the DNS request, it may then determine to which user this device belongs to (e.g., each device may be associated with a user). At this point it may select an appropriate user filtering policy to apply and how to respond to the DNS request.

The service gateway 110 may split or bifurcate DNS requests received from the client device 105 so they may be processed in parallel by a DNS server of the ISP and an external DNS server. To this end, the DNS router 155 of the services gateway 110 may bifurcate DNS requests by forwarding them to both the ISP DNS server 115 and the external DNS server 120. The DNS router 155 may determine an internet address for a DNS service of an ISP (e.g., the ISP DNS server 115, etc.).

For example, the DNS router 155 of the services gateway 110 may reference a table of DNS server addresses to identify the IP address for the DNS server of the ISP. The ISP may provide external network services to the services gateway 110. The DNS router 155 may determine an internet address for a DNS service provider external to the ISP (e.g., the external DNS server 120, etc.). For example, the DNS router 155 may reference a table of external DNS server provider addresses to determine the internet address of the external DNS server 120. The external DNS service provider may maintain a website filtering policy. The DNS router 155 may forward the DNS request to the internet address for the DNS service of the ISP (e.g., the ISP DNS server 115, etc.) and the internet address of the DNS service provider external to the ISP (e.g., the external DNS server 120, etc.). For example, the DNS router 155 may forward the DNS request associated with www.somewebsite.com to the ISP DNS server 115 and the external DNS server 120.

The DNS router 155 may receive a response to the DNS request from the DNS service of the ISP (e.g., from the ISP DNS server 115, etc.). The DNS router 155 may store (e.g., in memory, etc.) the response while waiting for a response from the DNS service provider external to the ISP. For example, the DNS router 155 may receive a response to the DNS request associated with the request for www.somewebsite.com and the DNS router 155 including the IP address of the host somewebsite.com and the DNS router may store the response in memory until a response is received from the external DNS server 120. Alternatively or additionally, the DNS router 155 may store a response to the DNS request received from the DNS service provider external to the ISP if it is received before the response from the DNS service of the ISP.

The services gateway 110 may evaluate the responses received from the ISP DNS server 115 and the external DNS server 120 to determine a response, if any, to transmit to the client device 105. To this end, the comparator 160 of the service gateway 110 may evaluate the responses to determine a DNS request response to be transmitted to the client device 105. For example, the comparator 160 may determine if the requests include the same or similar answer to the DNS request. The ISP DNS service may return an answer section with an indication of an IP address corresponding to the hostname included in the DNS request. The comparator 160 may compare the answer section of the response received from the ISP DNS service to an answer section included in the response received from the DNS service external to the ISP.

A DNS response may include a field called 'ANSWER', which could be empty or could include one or more IP addresses. The comparator 160 may return the result received from the ISP DNS if the response from the external DNS has some value in the ANSWER section. If the response from the external DNS is empty, then the gateway may respond to the client device with a DNS response with an empty ANSWER section. In other words, the comparator 160 may evaluate whether the response from the external DNS is empty or not.

If empty, the comparator 160 may respond by transmitting an empty ANSWER section to the client device. If populated (e.g., non-empty), then the comparator 160 may respond by transmitting the answer received from the ISP DNS. In other words, the content of the ANSWER section received from the external DNS is significant in whether it is populated or empty. For example, the comparator 160 may indicate a Boolean condition whether the response from the ISP will be returned or not. This may ensure that the external DNS does not get in the way or intrude with the values returned from the ISP DNS.

The DNS service external to the ISP may check the hostname and an IP address corresponding with the hostname to a set of filtering policies associated with the client computing device identifier. Thus, the response to the DNS request received from the DNS service external to the ISP may include an indication of whether a host included in the DNS request was allowed or blocked based on an evaluation by a DNS server of the DNS provider external to the ISP of the host to one or more filtering lists. For example, the DNS request response from the external DNS service provider may include an answer section indicating that hostname somewebsite.com corresponds with IP address 127.0.0.1 and the response received from the DNS service of the ISP may include an answer section indicating that hostname somewebsite.com corresponds with IP address 127.0.0.1. In response, the comparator 160 may generate a response forwarding the response received from the ISP DNS service for transmission to the client device 105.

In some cases, the DNS request response from the external DNS service provider may indicate that the host is blocked (e.g., contains a blank answer section, answer section includes an indication the message was blocked, etc.). The comparator 160 may determine that the answer section of the response received from the DNS service external to the ISP does not match the answer section of the response received from the ISP DNS service. For example, a blank answer section may be determined not to match an answer section including the indication that hostname somewebsite.com corresponds to IP address 127.0.01.

In some examples, the comparator 160 may discard (e.g., not transmit, etc.) the response received from the DNS service of the ISP if the response received from the DNS service external to the ISP contains a blank answer section. If the DNS service external to the ISP returns a blank answer section, a response including a blank answer section may be transmitted to the client device preventing the client device from proceeding to the requested website. In some examples, a message indicating the DNS request was blocked may be generated by the comparator 160 for transmission to the client device 105 if it is determined that the response from the DNS service external to the ISP does not match the response received from the ISP DNS service. In an example, the DNS request response may include a message that the website has been blocked by the DNS service provider external to the ISP (e.g., the external DNS server 120, etc.)

Upon determining a response to be transmitted to the client device 105, the comparator 160 may transmit the response to the transceiver 145 for processing. The transceiver 145 may then transmit the DNS request response to the client device 105. The client device 105 may be connected to an internal network provided by the services gateway 110. In some examples, the transceiver 145 may forward the response to the DNS request received from the DNS service of the ISP.

In some examples, the services gateway 110 may determine an identifier of a sender (e.g., a client computing device of the one or more client computing devices 105) of the DNS request. The identifier of the sender may be the device identifier, such as the MAC address. The device identifier of the sending device may be forwarded to the external DNS server 120 along with the DNS request. The response received from the external DNS server 120 may also include the identifier of the sender, e.g., MAC address, etc.

The internal network may use non-publicly addressable IP addresses that can protect the client computing devices 105 from external threats. When the client device 105 requests an external resource (e.g., a webpage, etc.), the internal IP address of the client may be translated (e.g., using network address translation (NAT), etc.) into an externally accessible address assigned to the services gateway.

The present subject matter may be implemented in various configurations. For example, the transceiver 145, the client manager 150, the DNS router 155, and the comparator 160 may be implemented in different (or the same) computing systems (e.g., a single server, a collection of servers, a cloud-based computing platform, etc.). A computing system may comprise one or more processors (e.g., hardware processor 702 described in FIG. 7, etc.) that execute software instructions, such as those used to define a software or computer program, stored in a computer-readable storage medium such as a memory device (e.g., a main memory 704 and a static memory 706 as described in FIG. 7, a Flash memory, random access memory (RAM), or any other type of volatile or non-volatile memory that stores instructions), or a storage device (e.g., a disk drive, or an optical drive).

Alternatively, the computing system may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
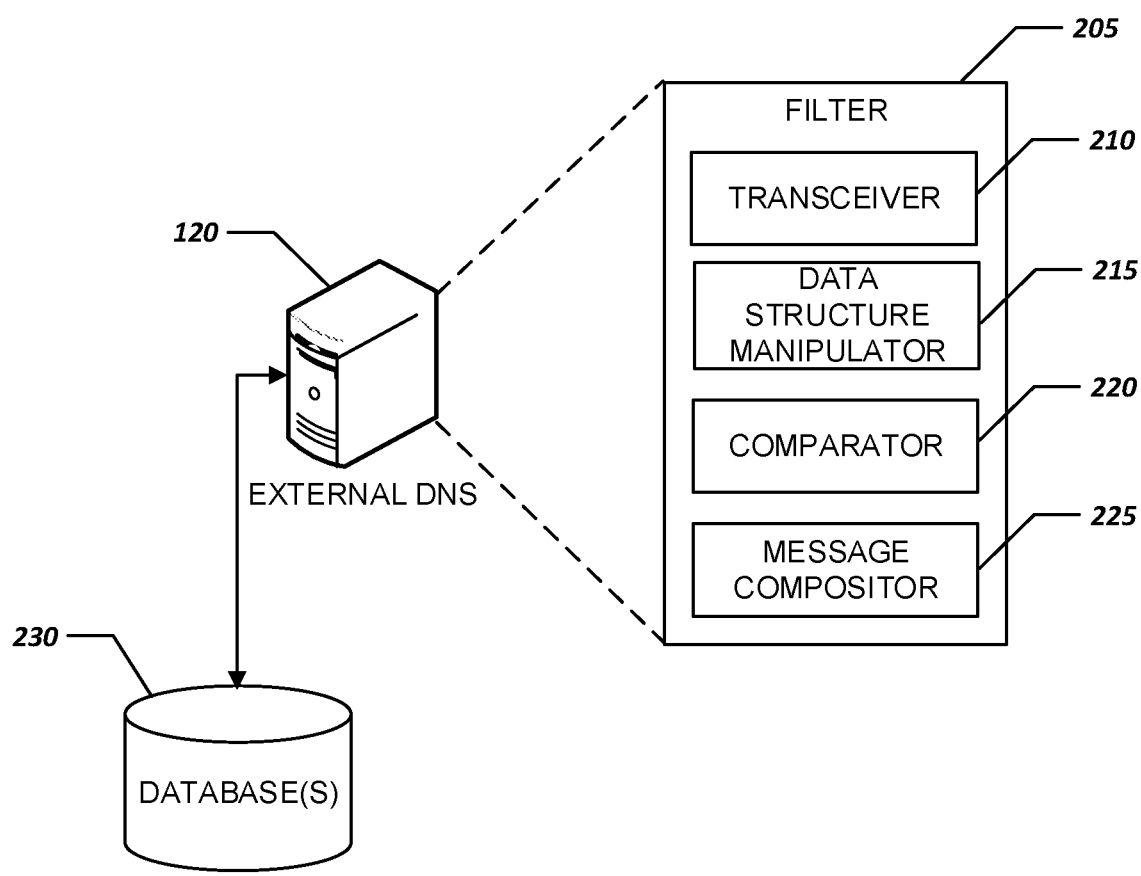
FIG. 2 illustrates an example of a domain name system service for website filtering using bifurcated domain name system, according to various embodiments.

FIG. 2 illustrates an example of a domain name system service 200 for website filtering using bifurcated domain name system, according to various embodiments. The domain name system (DNS) service 200 may include a collection of DNS servers such as external DNS server 120 as described in FIG. 1. The external DNS server may be communicatively coupled to one or more databases 230. The one or more databases 230 may include databases including lists (e.g., collections, etc.) of DNS records (e.g., hostname to internet protocol (IP) address pairs, etc.) and filtering policies (e.g., collections of allowed and blocked hostnames and IP addresses, etc.).

The external DNS server 120 may include a filter 205 for filtering DNS requests (e.g., identifying allowed requests and blocked requests, etc.). The filter 205 may include a variety of components such as transceiver 210, data structure manipulator 215, and message compositor 225.

The transceiver 210 may receive and process incoming and outgoing data. For example, the transceiver 210 may receive a DNS request and a filter list from a services gateway (e.g., the services gateway 110 as described in FIG. 1, etc.). The transceiver may receive a DNS request forwarded by a services gateway. For example, a user of a client computing device (e.g., a client computing device of the one or more client computing devices 105 as described in FIG. 1) connected to an internal network (e.g., the internal network 135 as described in FIG. 1) provided by the services gateway may request a webpage using a uniform resource locator (URL) of www.somewebsite.com and the services gateway may forward a DNS request sent by the client computing device to resolve somewebsite.com to an internet protocol (IP) address.

The comparator 220 may extract a hostname corresponding with a website from the DNS request. The comparator may then resolve the hostname to an internet address. In an example, the comparator 220 may compare the hostname to a set of DNS records stored in the one or more databases 230. For example, the comparator 220 may compare the hostname somewebsite.com to the DNS records and the comparison may indicate that an address of 127.0.0.1 corresponds with the hostname somewebsite.com.

The comparator 220 may compare the internet address to a website filtering policy. Alternatively or additionally, the comparator 220 may compare the hostname to the website filtering policy. In an example, the website filtering policy may include one or more internet addresses. In an example, the website filtering policy may include one or more hostnames. In some examples, the transceiver 205 may receive a device identifier for a computing device that sent the DNS request to the services gateway.

The comparator 220 may select the website filtering policy using the identifier. DNS servers are configured as authoritative over some domain names and for other domain names they may make use of a recursive mechanism to be routed to an authoritative DNS server for the domain name. A local database of DNS entries may exist for a list of domain names over which a DNS server is authoritative. DNS servers may cache of previous responses to avoid recursive calls which already occurred which may speed up the response. However, the external DNS server may not contain traditional DNS records as it may not provide traditional DNS resolution but rather may reference a set of website filtering policies providing an indication whether a website is allowed or blocked, for example, by returning a populated or an empty ANSWER section in response to a DNS request. However, the external DNS server may cache responses to requests to increase response times.

In some examples, the comparator 220 may run a comparison against a plurality of website filtering policies. A website filtering policy may include records of blocked and allowed websites. In some examples, the website filtering policy may be specific to a client device connected to the internal network provided by the services gateway.

The data structure manipulator 215 may create and modify the website filtering policy. The website filtering policy may be created as a data structure (e.g., formatted information stored in memory, storage, etc.). The data structure manipulator 215 may manipulate a data structure associated with the website filtering policy automatically (e.g., without user interaction) and manually (e.g., with user interaction). For example, the DNS service may use a variety of rules (e.g., if/then assessments, database query instructions, etc.) for determining websites that should be filtered. The data structure manipulator 415 may manipulate the data structure associated with the website filtering rule based on the rule. For example, a new computer threat type (e.g., computer virus, phishing, etc.) may be identified and the data structure manipulator 215 may expand the data structure corresponding to the website filter list to include the new threat type.

In some examples, the transceiver 210 may receive a website category from a user. In an example, the user may be a services gateway subscribed to the DNS service. In some examples, website categorization may be obtained from predefined lists (e.g., publicly available, open-sourced, closed commercial lists, etc.). In an example, a user interface may be provided to a user of the services gateway and the website category may be received using input obtained from the graphical user interface. For example, the user may then be presented with a graphical user interface allowing selection of one or more available website categories. The data structure manipulator 215 may generate a new data structure based on the category or may manipulate an existing data structure to include the category. The data structure manipulator 215 may then determine one or more websites corresponding with the category and may include the one or more websites in the data structure corresponding to the website filtering list.

The data structure manipulator 215 may determine a set of internet addresses using the website category and may create the website filtering list using the set of internet addresses. Alternatively or additionally, the data structure manipulator 215 may determine a set of hostnames using the website category and may create the website filtering list using the set of hostnames. For example, the user may have provided a category of adult sites and the data structure manipulator 215 may obtain the set of internet addresses and the set of hostnames from a repository of websites organized by category. In an example, the DNS service may store and maintain a categorized list of websites in a database included in the one or more databases 230.

In some examples, a user may provide one or more individual websites along with an indication of whether each of the one or more websites should be allowed or blocked. The data structure manipulator 215 may include the one or more websites and the indication in the website filtering policy. For example, the user may manage parental controls by:

creating a user object for each user in his house, like one for 'John Smith', and one for 'Michael Smith'

Manage policy by user. The user may specify allowed or blocked categories and may specify specific websites that may be either always allowed or blocked regardless of corresponding category.

The user may associate devices, with the device identifier, to each user (e.g., each user of the internal network, etc.) so that the policy may be applied to each user associated device.

For example, www.cnn.com may be identified as a 'News' site, or www.google.com may be identified as a 'Search' site. This information may be used in combination with a user profile for the computing device sending the DNS request. For example, the user profile may say that Michael Smith is allowed to visit 'Search' sites, but not 'News' sites. In some examples, the user profile may include calendaring features that may allow a user to visit websites as some times and dates and not at other times or dates. For example, Michael may be allowed to visit news sites between 7:00 pm and 8:00 pm Monday through Friday and 12:00 pm to 8:00 pm on Saturday and Sunday.

The message compositor 225 may generate a response to the received DNS request based on the comparison by the comparator 220. The message compositor may generate a response including an indication of whether the DNS request should be allowed or blocked based on the comparison. For example, if the comparison indicates that the somewebsite.com contains malicious content (e.g., a phishing webpage, etc.) then the message may include an indication (e.g., a blank answer section, etc.) that the DNS request was blocked and an indication that the DNS request was blocked as containing malicious content.

The transceiver 205 may transmit a response to the DNS request to the services gateway based on the comparison. In an example, the transceiver 205 may transmit the response generated by the message compositor 225.

Figure 3:
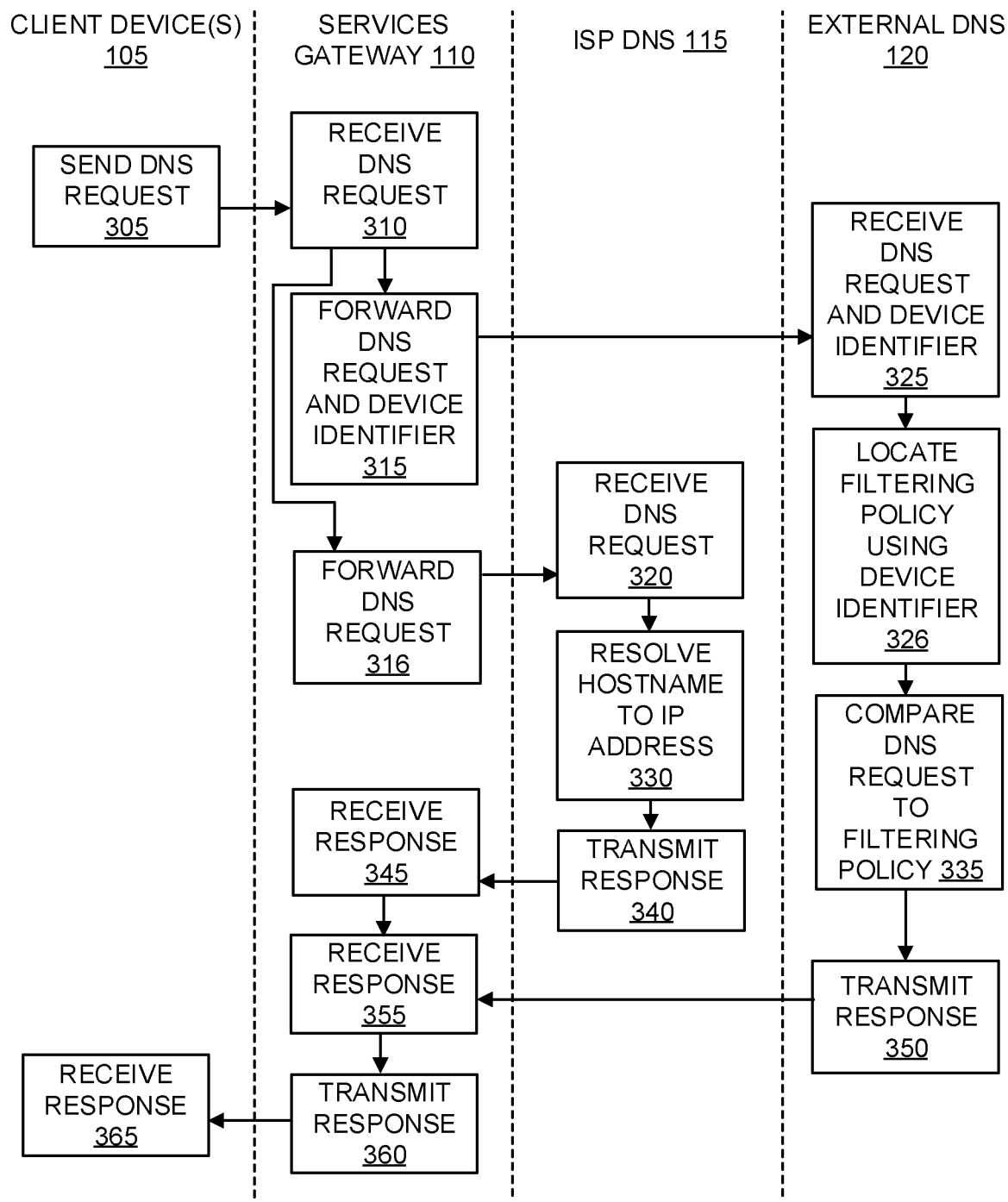
FIG. 3 illustrates an example of a workflow for website filtering using bifurcated domain name system, according to various embodiments.

FIG. 3 illustrates an example of a workflow 300 for website filtering using bifurcated domain name system, according to various embodiments. The workflow 300 may provide similar functionality as discussed in FIGS. 1 and 2.

At operation 305, a client device 105 may send a domain name system (DNS) request to the services gateway 110. For example, a user of the client device 105 may open a browser window and request a website with a uniform resource locator (URL) of www.somewebsite.com that may cause the client device 105 to transmit a DNS request to the services gateway 110 to resolve the hostname somewebsite.com to an internet protocol (IP) address. Included in DNS request 305, is a unique device identifier.

At operation 310, the services gateway 110 may receive the DNS request and the device identifier. For example, the services gateway may receive the DNS request including the hostname somewebsite.com and the MAC address for the requesting client device 105. The services gateway 110 may then forward the request and device identifier to the external DNS server 120 at operation 315.

The services gateway may be configured with an IP address for one or more DNS servers, such as external DNS server 120, responsible for resolving hostnames and filtering websites for an external DNS service provider. The services gateway 110 may then forward the request to the ISP DNS server 115 at operation 316. The services gateway 110 may be configured with an IP address for one or more DNS servers, such as internet service provider (ISP) DNS server 115, responsible for hostname to IP address resolution for the ISP. The services gateway 110 may be configured to forward (e.g., based on routing rules, etc.) DNS requests to the ISP DNS server 115 and the external DNS server 120.

At operation 320, the ISP DNS server may receive the DNS request. For example, the ISP DNS server 115 may receive the DNS request including the hostname www.somewebsite.com. The ISP DNS server 115 may reference stored DNS records including hostname and IP address pairs. In some examples, the ISP DNS server 115 may reference another DNS server to locate DNS records for hostnames that may not be found in the stored DNS records.

At operation 330, the ISP DNS server 115 may resolve the hostname to an IP address. For example, the ISP DNS server 115 may resolve the hostname www.somewebsite.com to IP address 127.0.0.1. The ISP DNS server 115 may then transmit a response to the services gateway 110 at operation 340. For example, the ISP DNS server 115 may transmit a response including an answer section indicating that hostname somewebsite.com resolves to IP address 127.0.0.1.

At operation 325, the external DNS server 120 may receive the DNS request and device identifier transmitted by the services gateway 110. For example, the external DNS server 120 may receive the DNS request to resolve hostname somewebsite.com to an IP address. The external DNS server 120 may also receive the device identifier for the requesting client device 105.

At operation 326, the external DNS server 120 may locate a website filtering policy associated with the device identifier, the website filtering policy including identifiers (e.g., hostnames, IP addresses, etc.) of websites which should be allowed or blocked. The one or more website filtering policies may be selected using the device identifier of the client device 105. For example, the external DNS server 120 may select the website filtering policy corresponding to the device identifier of the client device 105.

At operation 335, the external DNS server 120 may compare the DNS request to one or more website filtering policies. For example, the external DNS server 120 may identify a category of websites to be blocked and may consult a user policy (e.g., based on the device identifier, etc.) to determine whether this particular DNS request's website is allowed or blocked.

The external DNS server 120 may determine if the hostname and an IP address corresponding to the hostname are included in the one or more website filtering policies. For example, the external DNS server may compare the hostname www.somewebsite.com with the website filtering policy corresponding with the device identifier of the client device 105 and determine that the hostname is blocked. The external DNS server 120 may then compose a response to the DNS request. For example, if the hostname is not determined to be blocked or the hostname is determined to be allowed (e.g., not found in the one or more website filtering policies, found on a policy indicating the hostname should be allowed, etc.) a response with the answer section populated may be composed. For example, if the hostname is determined to be blocked a response without information in the answer section may be composed. At operation 350, the external DNS server 120 may then transmit the composed response to the service gateway 110.

At operation 345, the services gateway 110 may receive the response to the DNS request transmitted by the ISP DNS server 115. For example, the services gateway 110 may receive a response from the ISP DNS server 115 with an answer section indicating that hostname somewebsite.com resolves to IP address 127.0.0.1.

At operation 355, the services gateway 110 may receive the response to the DNS request transmitted by the external DNS server 120. For example, the services gateway 110 may receive a response from the external DNS server 120 with an answer section indicating that hostname www.somewebsite.com resolves to IP address 127.0.0.1 if the hostname www.somewebsite.com or the IP address 127.0.0.1 were determined by the external DNS server 120 to be allowed. For example, the services gateway 110 may receive a response from the external DNS server 120 with a blank answer section if the hostname somewebsite.com or the IP address 127.0.0.1 were determined by the external DNS server 120 to be blocked.

At operation 360, the service gateway 110 may compare the response received from the ISP DNS server 115 and the external DNS server 120 to generate a response to be transmitted to the client device 105. For example, the services gateway 110 may discard the response received from the ISP DNS server 110 and transmit a response including a blank answer section if the response received from the external DNS server 120 contains a blank answer section. In an example, the services gateway 110 may forward the response received from the ISP DNS server if the answer section of the response received from the external DNS server 120 matches (e.g., is non-empty, etc.) the answer section of the response received from the ISP DNS server 115. In some examples, the services gateway 110 may generate a response for transmission to the client device 105 including a message indicating that the request was blocked and a reason (e.g., known phishing website, known gambling site, etc.) why the request was blocked. In an example, the external DNS server 120 may include the reason the request was blocked with the response transmitted at operation 350.

At operation 365, the client device 105 may receive a response to the DNS request. For example, the response may include an answer section indicating that the hostname www.somewebsite.com resolves to IP address 127.0.0.1 and the web browser may retrieve a webpage corresponding with www.somewebsite.com hosted by a computing device having IP address 127.0.0.1.

Figure 4:
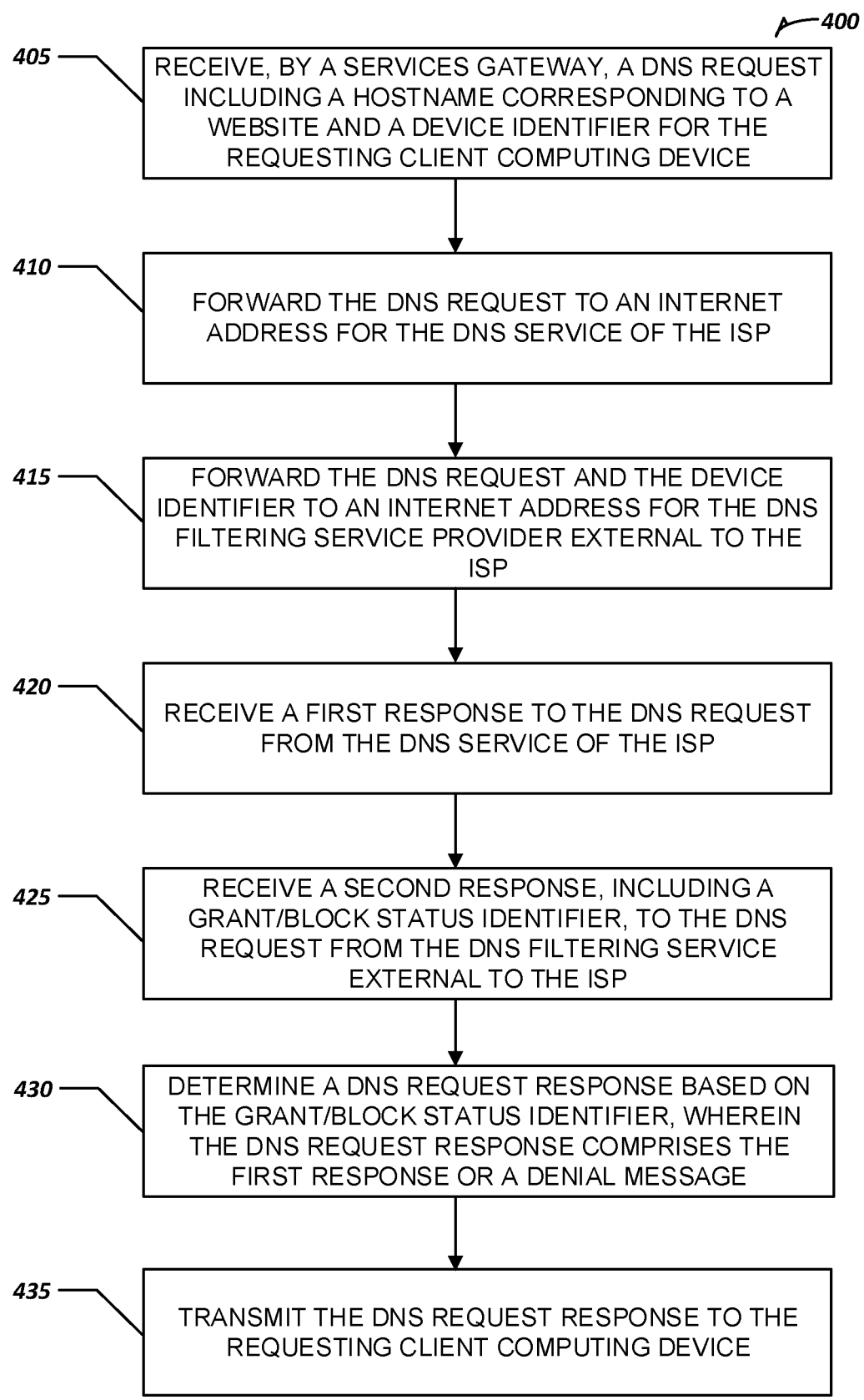
FIG. 4 illustrates a flowchart of an example of a method for website filtering using bifurcated domain name system, according to various embodiments.

FIG. 4 illustrates a flowchart of an example of a method 400 for website filtering using bifurcated domain name system, according to various embodiments. The method 400 may provide similar functionality as described in FIG. 1.

At operation 405, a domain name system (DNS) request may be received by a services gateway (e.g., the services gateway 110 as described in FIG. 1). The DNS request may include a hostname corresponding to a website and a device identifier for the requesting device. For example, a user may request a website using a uniform resource locator (URL) www.somewebsite.com. In an example, the DNS request may be received from a computing device (e.g., a computing device of the one or more computing devices 105 as described in FIG. 1) connected to an internal network (e.g., the internal network 135 as described in FIG. 1) provided by the services gateway. The request may also include a device identifier for the computing device (e.g., a computing device of the one or more computing devices 105 as described in FIG. 1) such as a MAC address or other unique device identifier.

At operation 410, the DNS request may be forwarded to the internet address for the DNS service of the ISP (e.g., the ISP DNS server 115 as described in FIG. 1). The ISP may provide external network services to the services gateway. For example, the ISP may provide access to an external network such as the internet. For example, the services gateway may forward the DNS request to the ISP DNS server 115 (as described in FIG. 1) using its IP address.

At operation 415, the DNS request and device identifier may be forwarded to the internet address of the DNS service provider external to the ISP (e.g., the external DNS server 120 as described in FIG. 1). For example, the services gateway may forward the DNS request to the external DNS server 120 (as described in FIG. 1) using its IP address. The DNS service provider external to the ISP may maintain a website filtering policies. For example, the external DNS server may query a database of website filtering policies including a website filtering policy corresponding to the device identifier of the computing device 105 (as described in FIG. 1).

At operation 420, a first response to the DNS request may be received from the DNS service of the ISP. For example, the ISP DNS server 115 (as described in FIG. 1) may respond to a DNS request for the hostname somewebsite.com by returning an answer indicating that hostname somewebsite.com corresponds to IP address 127.0.0.1. The services gateway may then hold the response until a response is received from the DNS service provider external to the ISP.

At operation 425, a second response to the DNS request may be received from the DNS service provider external to the ISP including a grant/block status identifier. For example, the external DNS server 120 (as described in FIG. 1) may respond to a DNS request for the hostname somewebsite.com by returning an answer indicating that hostname somewebsite.com corresponding to IP address 127.0.0.1 is not blocked, or granted, (e.g., contains an answer section). The services gateway may then hold the response until a response is received from the DNS service of the ISP.

At operation 430, the services gateway (e.g., the services gateway 110 as described in FIG. 1) may determine a DNS request response to the requesting computing device (e.g., a computing device of the one or more computing devices 105 as described in FIG. 1). The determination may be based on the grant/block status identifier received in operation 425 from the DNS service provider external to the ISP. The DNS request response may comprise either the first response from the ISP DNS server 115 or a denial of access message (e.g. the requested website is blocked).

For example, the services gateway may receive a grant/block status identifier response from the external DNS server 120 indicating the requested website somewebsite.com is granted. The services gateway may then construct a DNS request response with the answer received from the ISP DNS server 115 indicating that hostname www.somewebsite.com corresponds to IP address 127.0.0.1. For another example, the services gateway may receive a grant/block status identifier response from the external DNS server 120 indicating the requested website www.somewebsite.com is blocked. The services gateway may then construct a DNS request response with an access denial message for website somewebsite.com.

At operation 435, a DNS request response may be transmitted to the requesting client computing device (e.g., a computing device of the one or more computing devices 105 as described in FIG. 1). The client computing device may be connected to an internal network provided by the services gateway.

In some examples, the response from the DNS service external to the ISP may include an empty answer section. In some examples, the service gateway may be configured such that it may resolve responses received with an empty answer section to a particular IP address for a particular ISP. This may allow different web pages to be displayed for different ISP. The external DNS service may be multi-tenant (e.g., serving requests from multiple ISPs, etc.) and if it returns the IP address of such a website, it may look the same for each ISP. In some examples, the services gateway may return an IP address corresponding to the ISP the services gateway is a subscriber.

In some examples, an identifier of a sender of the DNS request may be determined. In an example, the identifier may be unique device identifier for the device sending the request. The device identifier of the sender may be forwarded to the DNS service provider external to the ISP along with the DNS request. For example, the sender of the DNS request may have a MAC address of 00:00:00:00:23. The DNS service provider external to the ISP may use the device identifier to select a website filtering policy to use in determining a response to the DNS request. The response received from the DNS service external to the ISP may include the device identifier of the client computing device to which the response is transmitted. For example, the client computing device may be the sender of the request having MAC address 00:00:00:00:23.

Figure 5:
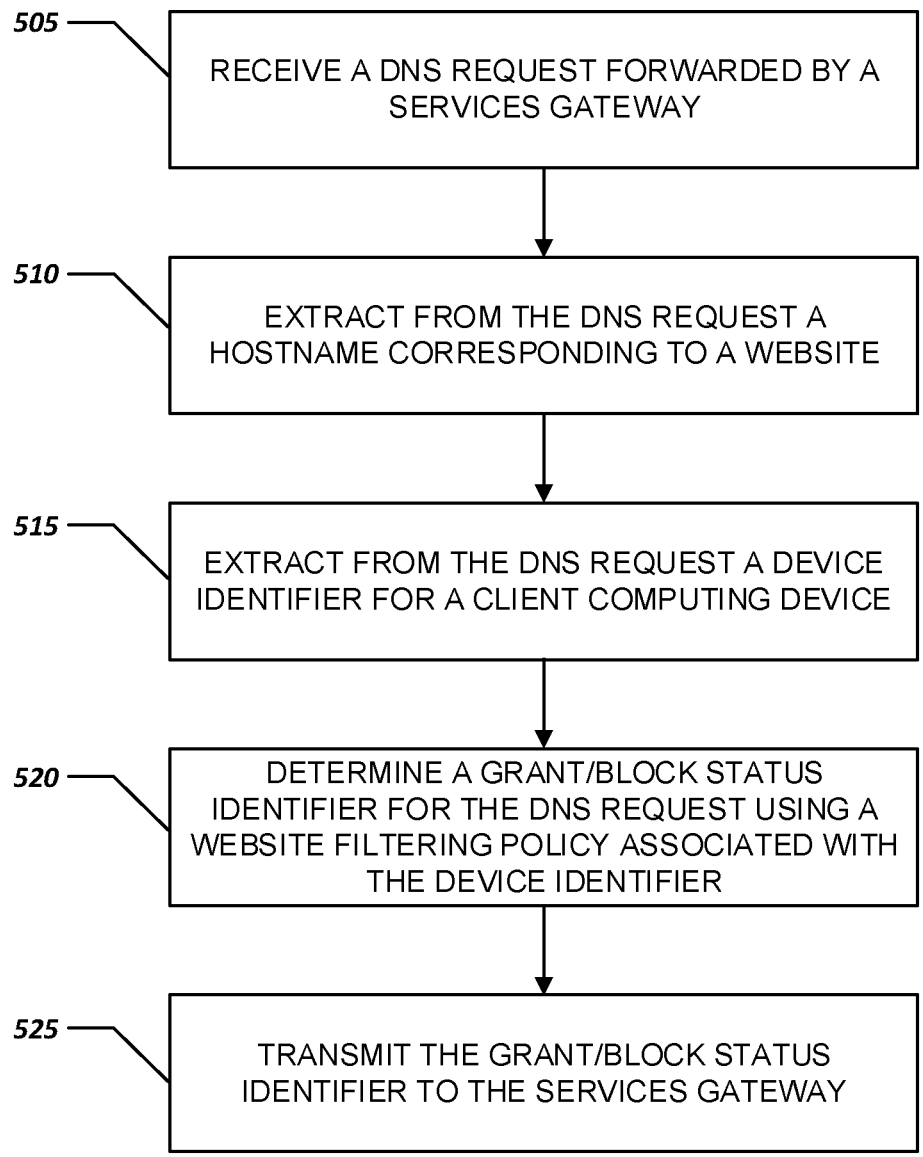
FIG. 5 illustrates a flowchart of an example of a method for website filtering using bifurcated domain name system, according to various embodiments.

FIG. 5 illustrates a flowchart of an example of a method 500 for website filtering using bifurcated domain name system, according to various embodiments. The method 500 may provide similar functionality as described in FIG. 2.

At operation 505, a domain name system (DNS) request forwarded by a services gateway may be received. For example, a DNS request may be received from a services gateway to resolve a hostname somewebsite.com to an internet protocol (IP) address.

At operation 510, a hostname corresponding to a website may be extracted from the DNS request. For example, the hostname may be www.somewebsite.com.

At operation 515, a device identifier corresponding to a requesting computing device may be extracted from the DNS request. For example, the device identifier may be MAC address 00:00:00:00:23.

At operation 520, the grant/block status identifier may be determined using a website filtering policy associated with the device identifier. In an example, the website filtering policy may include one or more internet addresses. In some examples, the website filtering policy may also have categories of websites. For example, there may be several computing devices connected to the internal network of the services gateway, each computing device may have a unique device identifier, a set website filtering policy may correspond respectively to a unique device identifier, and the website filtering policy may be selected using the device identifier of a computing device that sent the DNS request to the services gateway.

At operation 525, a response may be transmitted to the services gateway based on the determination. A response may be sent to the services gateway with an answer indicating that the hostname www.somewebsite.com resolves to IP address 127.0.0.1 if the determination indicates the website is allowed. A response may be sent to the services gateway with an answer that is blank if the comparison indicates the website is blocked. In an example, if the comparison indicates the website is blocked the response may include an answer including a message indicating why the website was blocked or an IP address for a website indicating why the website was blocked.

Figure 6:
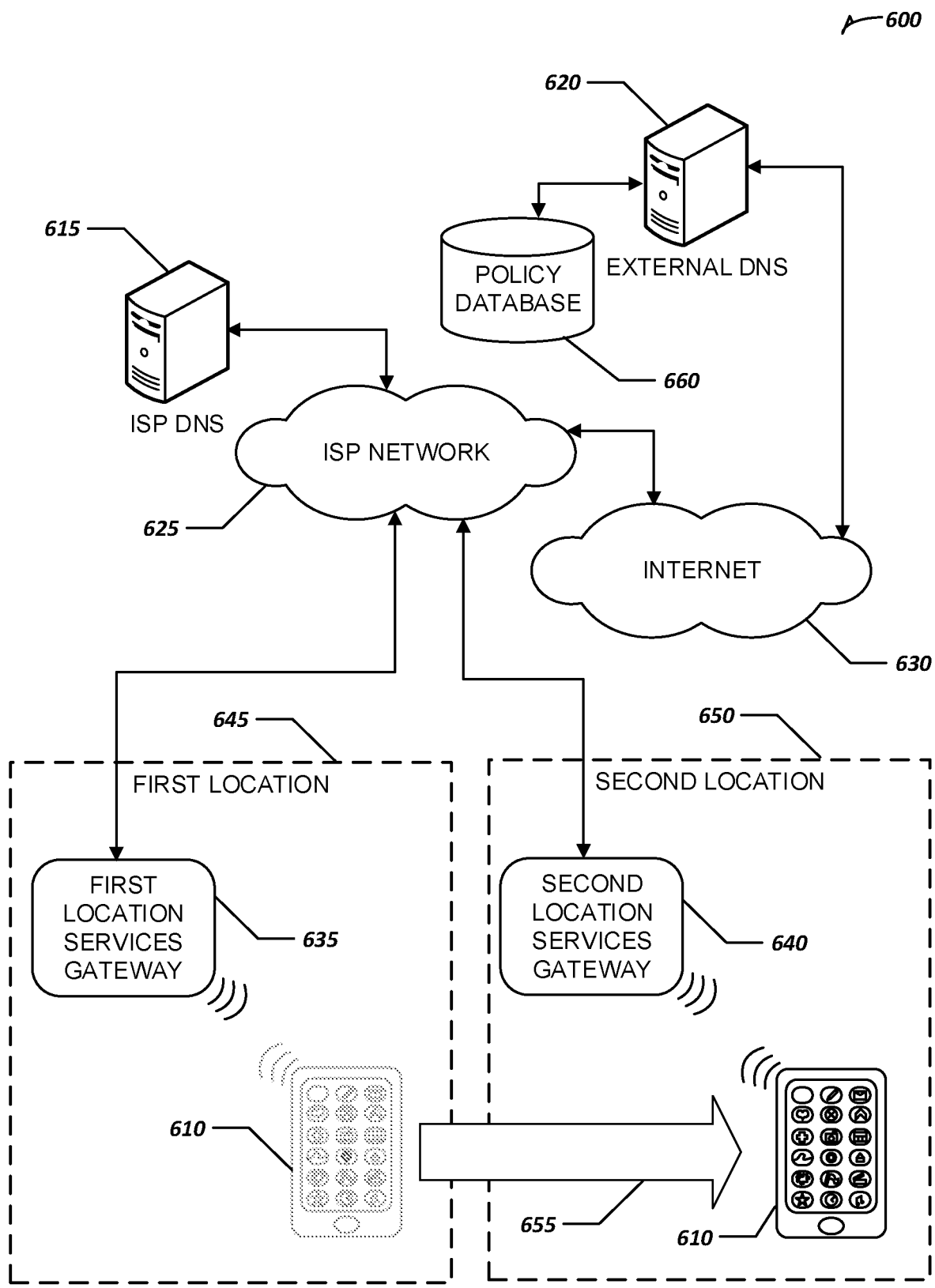
FIG. 6. Illustrates an example of a location independent domain name system for website filtering using bifurcated domain name system, according to various embodiments.

FIG. 6 illustrates an example environment 600 for applying a website filtering policy to a specific device, regardless of location. The environment 600 may include one or more client devices 610 communicatively coupled to a location's services gateway, such as first location services gateways 635 or second location services gateway 640, through an internal network (e.g., internal wired network, wireless network, etc.). The services gateways may be communicatively coupled to an internet service provider (ISP) domain name system (DNS) server 615 using an ISP network 625 and to an DNS server of an external DNS service provider 620 using an external network (e.g., the internet 630, etc.).

The ISP network 625 may be communicatively coupled (e.g., using a router, etc.) to the internet 630. The internet 630 may be considered external to the ISP network 625 and may include a collection of internet based resources such as the external DNS server 620. The external DNS server 620 may be maintained by an external DNS service provider and may evaluate DNS requests against one or more filtering policies to determine if a host provided in the DNS request should be allowed or blocked. The external DNS server 620 may locate website filtering policies stored in a policy database 660. For example, the external DNS server 620 may determine that the DNS request for hostname somewebsite.com should be blocked based on an evaluation of a filtering policy associated with the requesting client computing device. The filtering policy may include websites containing malicious content (e.g., computer viruses, phishing webpages, etc.).

A user of a client computing device 610 (also referred to in this disclosure as a "client device 610" or a "computing device 610") is located at a first location 645 and connected to the first location services gateway 635 internal network at a first location 645. As an example, the first location 645 may be a user's home or place of business. As described in FIG. 1, the client device 610 may request an internet resource (e.g., a webpage, etc.) from first location services gateway 635. The request may include a DNS request, such as resolving the IP address for the website www.somewebsite.com.

First location services gateway 635 may split or bifurcate the DNS requests received from the client device 610 so the requests may be processed in parallel by a DNS server of the ISP and an external DNS server. To this end, the first location services gateway 635 may bifurcate DNS requests by forwarding them to both the ISP DNS server 615 and the external DNS server 620. The DNS request to the external DNS server 620 may include the device identifier for client computing device 610 for purposes of determining website access.

The external DNS server 620 may determine if access should allowed or blocked to the client computing device 610 by locating a website filtering policy in the policy database 660 using the device identifier of the client computing device (e.g., the MAC address, serial number, etc.). Based on the websites the website filtering policy indicates are allowed or blocked, the external DNS server 620 may respond to the request sent by the first location services gateway 635. For example, the client computing device 610, when located at a first location 645, such as the user's home may make a request for website somewebsite.com to the first location services gateway 635. The first location services gateway 635 may then bifurcate the DNS request to the ISP DNS server 615 and the external DNS server 620. The request to the ISP DNS server 615 to resolve an IP address for the hostname somewebsite.com and the request to the external DNS server 620 to determine if the client computing device 610 may access the website somewebsite.com.

Continuing the example, the external DNS server 620 may locate, in the policy database 660, a website filtering policy associated with the device identifier for client computing device 610 that may indicate the website somewebsite.com is blocked. The external DNS server 620 may then send a response to the first location services gateway 635 that the website access request is blocked. The first location services gateway 635, at the first location 645 may then subsequently respond to client computing device 610 that the website somewebsite.com is blocked for client computing device 610.

The client computing device 610 may then change locations as indicated by arrow 655. Client computing device 610 that was previously located at first location 645 is now located at second location 650. As an example, second location 650 may be a friend's house, a coffee house, or school. Similar to the first location 645, second location 650 has its own services gateway, second location services gateway 640. Similar to when client device 610 is located at first location 645, the client device 610 may request an internet resource (e.g., a webpage, etc.) from second location services gateway 640. The request may include a DNS request, such as resolving the IP address for the website somewebsite.com. Second location services gateway 640 may split or bifurcate the DNS requests received from the client device 610 so the requests may be processed in parallel by a DNS server of the ISP and an external DNS server. To this end, the second location services gateway 640 may bifurcate DNS requests by forwarding them to both the ISP DNS server 615 and the external DNS server 620. The DNS request to the external DNS server 620 may include the device identifier for client computing device 610 for purposes of determining website access.

Similar to when the client computing device 610 made a request through the first location services gateway 635, the same request for hostname resolution and access permission process is followed at the second location services gateway 640. The second location services gateway may send a bifurcated request to the ISP DNS server 615 and the external DNS server 620.

Regardless of location for the client computing device 610, the external DNS server 620 may determine if access should allowed or blocked to the client computing device 610 by locating a website filtering policy in the policy database 660 using the device identifier of the client computing device. Based on the websites the website filtering policy indicates are allowed or blocked, the external DNS server 620 may respond to the request sent by the second location services gateway 640. For example, the client computing device 610, when located at a second location 650, such as the user's friend's home may make a request for website www.somewebsite.com to the second location services gateway 640. The second location services gateway 640 may then bifurcate the DNS request to the ISP DNS server 615 and the external DNS server 620. The request to the ISP DNS server 615 to resolve an IP address for the hostname somewebsite.com and the request to the external DNS server 620 to determine if the client computing device 610 may access the website somewebsite.com.

Continuing the example, the external DNS server 620 may locate, in the policy database 660, a website filtering policy associated with the device identifier for client computing device 610 that may indicate the website somewebsite.com is blocked, the same as when the external DNS server 620 received a request from the first location services gateway 635. The external DNS server 620 may then send a response to the second location services gateway 640 that the website access request is blocked. The second location services gateway 640, at the second location 650 may then subsequently respond to client computing device 610 that the website somewebsite.com is blocked for client computing device 610, the same as the first location services gateway did when client computing device 610 was located at the first location 645.

Figure 7:
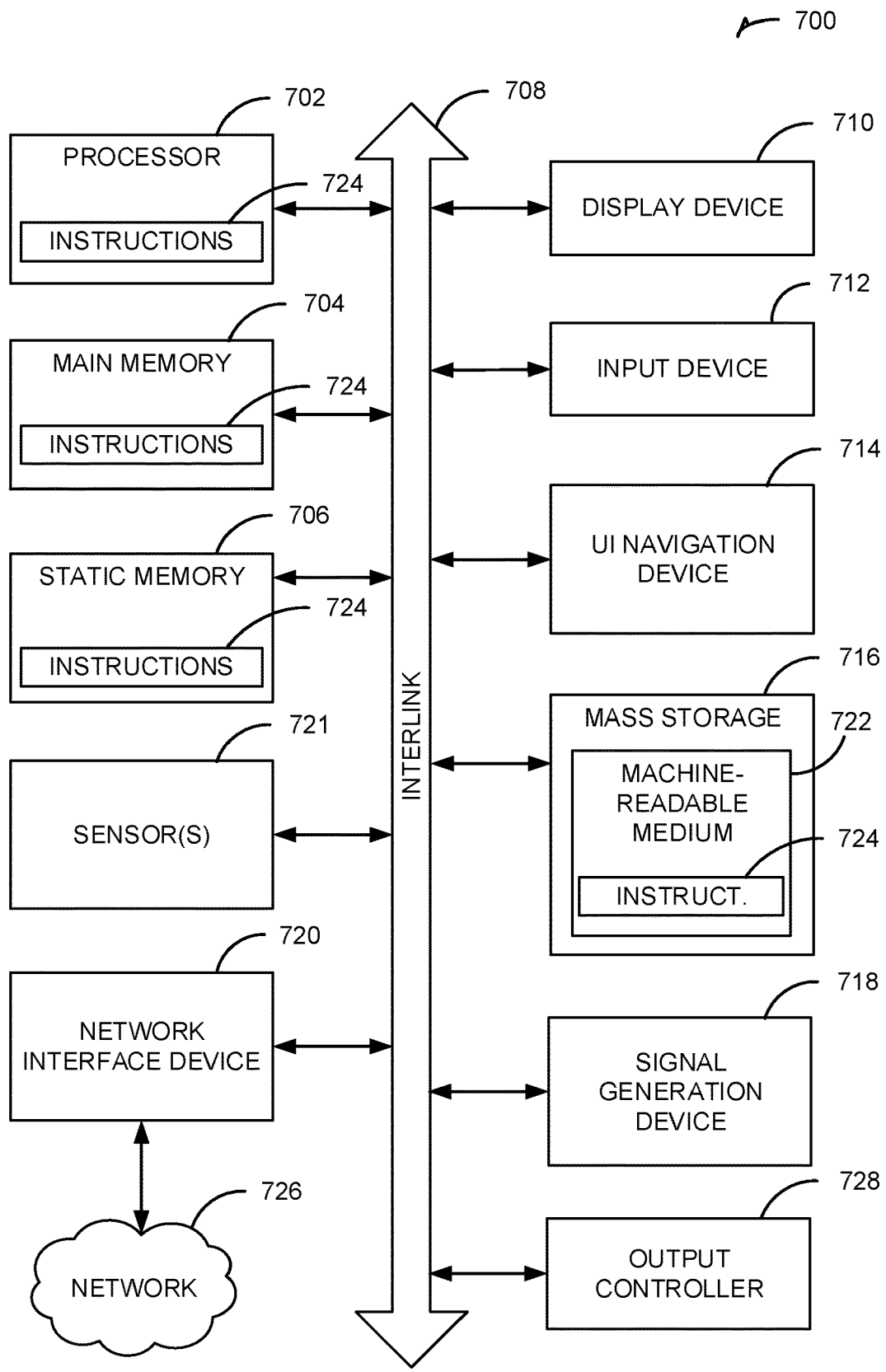
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., Universal Serial Bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

What is claimed is:

1. A service gateway for website filtering using a bifurcated domain name system (DNS), the service gateway comprising:
   one or more processors; and
   at least one memory including instructions that, when executed by the one or more processors, cause the one or more processors to perform operations to:
   receive a DNS request from a client computing device, the DNS request including a hostname corresponding to a website and a device identifier for the client computing device;
   forward the DNS request to an internet address for the DNS service of the internet service provider (ISP), the ISP providing external network services to the service gateway;
   forward the DNS request and the device identifier to an internet address for the DNS filtering service provider external to the ISP, the DNS filtering service provider maintaining one or more website filtering policies;
   receive a first response to the DNS request from the DNS service of the ISP;
   receive a second response to the DNS request from the DNS filtering service provider external to the ISP, wherein the second response includes a grant/block status identifier;
   determine a DNS request response based on the grant/block status identifier, wherein the DNS request response comprises either the first response or a denial message; and
   transmit the DNS request response to the client computing device, the client computing device connected to an internal network provided by the service gateway.

2. The service gateway of claim 1, wherein the instructions further cause the one or more processors to perform operations to:
   transmit the DNS request response comprising the first response when, within a predetermined time, the second response is not received from the DNS filtering service provider external to the ISP.

3. The service gateway claim of 1, wherein the instructions further cause the one or more processors to perform operations to:
   transmit at least one filtering policy update to the DNS filtering service provider external to the ISP.

4. The service gateway of claim 1, wherein the device identifier includes a MAC address.

5. The service gateway of claim 1, wherein the filtering policy includes at least one of websites and categories of websites.

6. The service gateway of claim 1, wherein the instructions further cause the one or more processors to perform operations to:
   receive the filtering policy associated with the device identifier from the DNS filtering service provider external to the ISP;
   store the filtering policy in the at least one memory.

7. At least one machine readable medium including instructions for website filtering using bifurcated domain name system (DNS) that, when executed by a machine, cause the machine to perform operations to:
   receive a DNS request, the DNS request including a hostname corresponding to a website and a device identifier for a requesting client computing device;
   forward the DNS request to both an internet address for the DNS service of the internet service provider (ISP), the ISP providing external network services to the services gateway;
   forward the DNS request and the device identifier to an internet address for the DNS filtering service provider external to the ISP, the DNS service provider maintaining one or more website filtering policies;
   receive a first response to the DNS request from the DNS service of the ISP;
   receive a second response to the DNS request from the DNS filtering service provider external to the ISP, wherein the second response includes a grant/block status identifier;
   determine a DNS request response based on the grant/block status identifier, wherein the DNS request response comprises either the first response or a denial message; and
   transmit the DNS request response to the requesting client computing device, the requesting client computing device connected to an internal network provided by the service gateway.

8. The at least one machine readable medium of claim 7, wherein the instructions to transmit the DNS request response to the requesting client computing device include instruction to transmit the DNS request response comprising the first response when, within a predetermined time, the second response is not received from the DNS filtering service provider external to the ISP.

9. The at least one machine readable medium of claim 7, wherein the instructions to transmit the DNS request response to the requesting client computing device include instruction to transmit at least one filtering policy update to the DNS filtering service provider external to the ISP.

10. The at least one machine readable medium of claim 7, wherein the device identifier includes a MAC address.

11. The at least one machine readable medium of claim 7, wherein the filtering policy includes at least one of websites and categories of websites.

12. The at least one machine readable medium of claim 7, wherein the instructions further cause the one or more processors to perform operations to:
   receive the filtering policy associated with the device identifier from the DNS filtering service provider external to the ISP;
   store the filtering policy in the at least one memory.

13. A method for website filtering using bifurcated domain name system (DNS), the method comprising:
- receiving, by a services gateway, a DNS request, the DNS request including a hostname corresponding to a website and a device identifier for a requesting client computing device;
- forwarding the DNS request to an internet address for the DNS service of the internet service provider (ISP), the ISP providing external network services to the services gateway;
- forwarding the DNS request and the device identifier to an internet address for the DNS service provider external to the ISP, the DNS service provider maintaining one or more website filtering policies;
- receiving a first response to the DNS request from the DNS service of the ISP;
- receiving a second response to the DNS request from the DNS filtering service provider external to the ISP, wherein the second response includes a grant/block status identifier;
- determining a DNS request response based on the grant/block status identifier, wherein the DNS request response comprises either the first response or a denial message; and
- transmitting, the DNS request response to the requesting client computing device, the requesting client computing device connected to an internal network provided by the service gateway.

14. The method of claim 13, further comprising transmitting the DNS request response comprising the first response when, within a predetermined time, the second response is not received from the DNS filtering service provider external to the ISP.

15. The method of claim 13, wherein the device identifier includes a MAC address.

* * * * *